United States Patent
Lee et al.

(10) Patent No.: US 8,035,556 B2
(45) Date of Patent: Oct. 11, 2011

(54) APPARATUS FOR TRANSMITTING PSEUDOLLITE SIGNAL BASED ON SINGLE CLOCK AND POSITIONING SYSTEM USING THE SAME

(75) Inventors: Sang-Uk Lee, Daejeon (KR); Cheon-Sig Sin, Daejeon (KR); Jaeeun Lee, Seoul (KR); Jae-Hoon Kim, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/857,363

(22) Filed: Aug. 16, 2010

(65) Prior Publication Data

US 2011/0037648 A1   Feb. 17, 2011

(30) Foreign Application Priority Data

Aug. 17, 2009 (KR) ................. 10-2009-0075819
Apr. 5, 2010 (KR) ................. 10-2010-0031054

(51) Int. Cl.
*G01S 19/11* (2010.01)
*G01S 19/03* (2010.01)

(52) U.S. Cl. ............................... 342/357.48; 342/357.4

(58) Field of Classification Search ............. 342/357.48, 342/357, 357.4
See application file for complete search history.

(56) References Cited

U.S. PATENT DOCUMENTS

| | | | |
|---|---|---|---|
| 6,107,954 A * | 8/2000 | Li | ................................... 342/54 |
| 6,201,497 B1 | 3/2001 | Snyder et al. | |
| 6,473,032 B1 | 10/2002 | Trimble | |
| 2003/0058163 A1 * | 3/2003 | Zimmerman et al. | ... 342/357.08 |
| 2005/0001742 A1 * | 1/2005 | Small | ............................. 340/988 |
| 2005/0015198 A1 * | 1/2005 | Kee et al. | ........................ 701/207 |
| 2006/0022872 A1 * | 2/2006 | Zimmerman | ................... 342/464 |
| 2009/0002230 A1 * | 1/2009 | Kee et al. | .................. 342/357.12 |
| 2010/0265127 A1 * | 10/2010 | de Salas | .................... 342/357.4 |

FOREIGN PATENT DOCUMENTS

| | | |
|---|---|---|
| EP | 1742080 A1 | 1/2007 |
| KR | 2001-0097597 A | 11/2001 |
| KR | 2003-0038449 A | 5/2003 |
| KR | 2004-0070847 A | 8/2004 |
| WO | WO-03/040752 A1 | 5/2003 |

OTHER PUBLICATIONS

Sanguk Lee et al., "A Synchronous Pseudollite System by Single Clock", The 16th GNSS Workshop International Symposium on GPS/GNSS, Nov. 4-6, 2009.

* cited by examiner

*Primary Examiner* — Thomas Tarcza
*Assistant Examiner* — Frank McGue
(74) *Attorney, Agent, or Firm* — Rabin & Berdo, P.C.

(57) ABSTRACT

An apparatus for transmitting a pseudolite signal so that a navigation signal is transmitted includes: at least four pseudolite configured to generate and output pseudolite codes for navigation; antennas configured to transmit signals outputted by the pseudolite corresponding to the antennas, respectively; and a single synchronization clock unit configured to provide each of the pseudolites with a synchronization clock.

14 Claims, 1 Drawing Sheet

APPARATUS FOR TRANSMITTING PSEUDOLLITE SIGNAL BASED ON SINGLE CLOCK AND POSITIONING SYSTEM USING THE SAME

CROSS-REFERENCE(S) TO RELATED APPLICATIONS

The present application claims priority of Korean Patent Application Nos. 10-2009-0075819 and 10-2010-0031054, filed on Aug. 17, 2009, and Apr. 5, 2010, respectively, which are incorporated herein by reference in their entirety.

BACKGROUND OF THE INVENTION

1. Field of the Invention

Exemplary embodiments of the present invention relate to a method and an apparatus for precise positioning using Global Positioning System (GPS) pseudolites in a space where no GPS signal can reach (e.g. indoor environment).

2. Description of Related Art

In general, a GPS system refers to a system for determining positions using satellites placed in a medium Earth orbit at a predetermined altitude from the Earth. Specifically, a user of the GPS system receives signals from at least four different satellites in the medium Earth orbit, and calculates his/her position using the received signals. Besides the current position, altitude information can also be acquired, if necessary, from the signals.

However, the GPS system has a limitation in that signals from the medium Earth orbit satellites cannot reach indoor environments or urban/canyon areas with densely located tall buildings and mountains, making the GPS positioning service unavailable.

Therefore, as an alternative to the GPS system in indoor environments or urban/canyon areas with densely located tall buildings and mountains, a method of using pseudolites has been proposed. The pseudolites will now be described briefly.

Pseudolites refer to devices for transmitting signals to indoor environments or areas where densely located tall buildings block signals from medium Earth orbit satellites, as if the signals are transmitted from the satellites.

The pseudolite system includes a number of pseudolites and a reference station for monitoring signals of the pseudolites and generating calibration information (e.g. time calibration information). The pseudolite system requires a wireless link to transmit calibration information from the reference station to users.

An advanced type of pseudolite system includes a master pseudolite and a number of slave pseudolites. This type of pseudolite system equips the master pseudolite with a precise time source so as not to use a wireless link for providing users with calibration information (e.g. time calibration information). A reference station, which is configured to monitor pseudolite signals, monitors the time of the slave pseudolites. A system has also been proposed in which, based on information regarding the time of a number of slave pseudolites monitored by a reference station, each slave pseudolite is synchronized by a PLL control circuit installed in the pseudolite. Such a pseudolite system including master and slave pseudolites is too expensive to be used for indoor positioning because a system of a number of pseudolites must be installed on each floor.

SUMMARY OF THE INVENTION

An embodiment of the present invention is directed to a pseudolite system, which can be implemented at a reduced cost, and a method for operating the same.

Another embodiment of the present invention is directed to a pseudolite system, which requires no pseudolite for providing calibration information (e.g. time information), and a method for operating the same.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting a pseudolite signal so that a navigation signal is transmitted includes: at least four pseudolites configured to generate and output pseudolite codes for navigation; antennas configured to transmit signals outputted by the pseudolites corresponding to the antennas, respectively; and a single synchronization clock unit configured to provide each of the pseudolites with a synchronization clock.

In accordance with another embodiment of the present invention, a positioning system using pseudolites includes: a pseudolite signal transmission system including a clock supply unit configured to provide a single synchronization clock, at least four pseudolites integrated into a single platform and configured to generate PRN (pseudorandom noise) codes identical to GPS signals and predetermined navigation data and output the generated PRN codes and navigation data while being synchronized with the clock, and antennas configured to emit output signals of the pseudolites, respectively; and a receiver configured to receive a navigation signal transmitted from each of the pseudolite antennas and perform positioning.

DESCRIPTION OF SPECIFIC EMBODIMENTS

Figure 1:
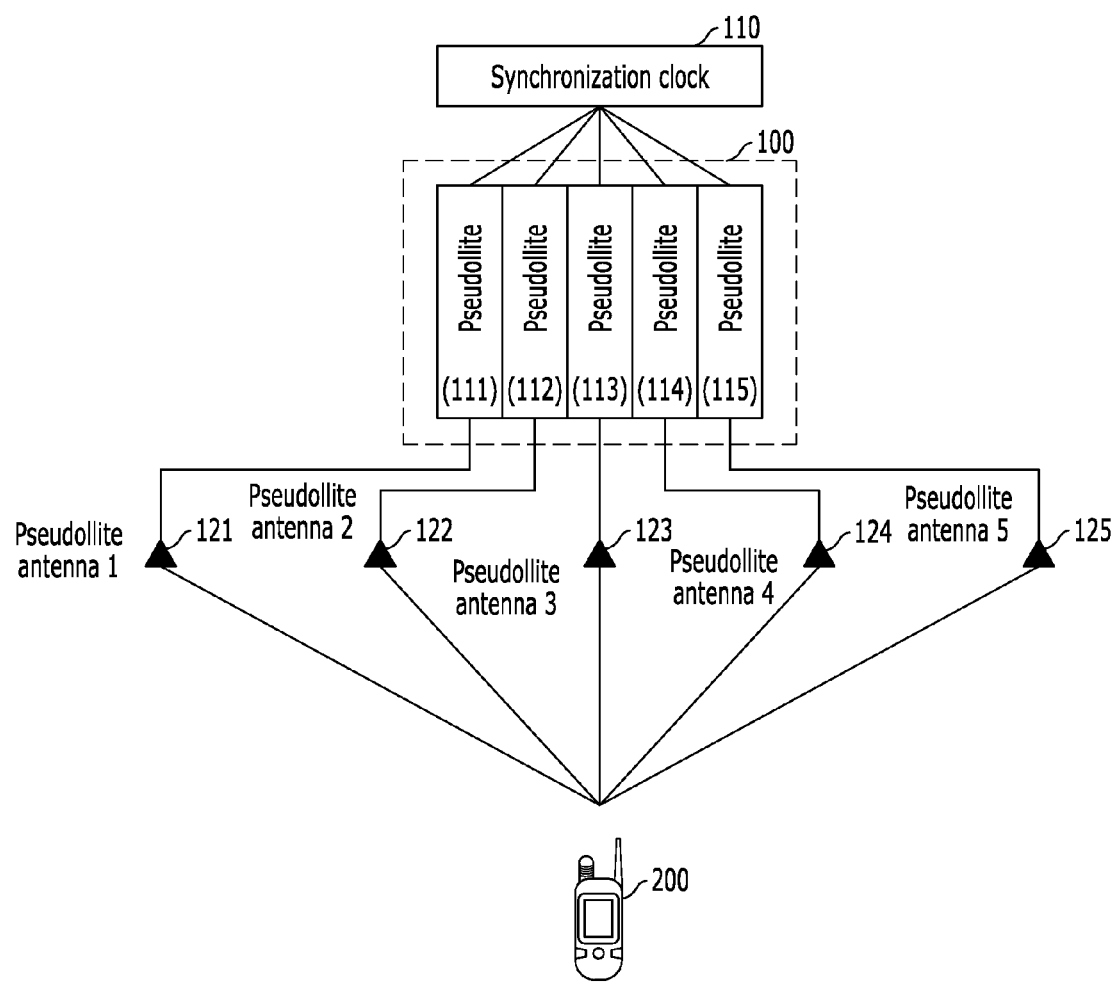
FIG. 1 illustrates the construction of a pseudolite positioning system to which the present invention is applied.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates the construction of a pseudolite positioning system to which the present invention is applied. The construction and operation of a pseudolite positioning system in accordance with the present invention will be described in detail with reference to FIG. 1.

The integrated pseudolite includes a main unit 100, a number of pseudolites 111, 112, 113, 114, and 115, a single synchronization clock 110 configured to synchronize the pseudolites 111, 112, 113, 114, and 115, and antennas 121, 122, 123, 124, and 125 configured to simultaneously transmit signals generated by the pseudolites 111, 112, 113, 114, and 115. The pseudolites 111, 112, 113, 114, and 115 and the antennas 121, 122, 123, 124, and 125 are matched in such a manner that one satellite and one antenna match with each other.

Each of the pseudolites 111, 112, 113, 114, and 115 is configured to simultaneously transmit a PRN identification number of a pseudolite, which is different from a GPS satellite, through each of the antennas 121, 122, 123, 124, and 125. The PRN identification number is used as a navigation signal. The receiver is configured to perform positioning using the PRN identification number (i.e. navigation signal), which is simultaneously transmitted by each pseudolite 111, 112, 113, 114, and 115 through each antenna 121, 122, 123, 124, and 125.

The pseudolite positioning system in accordance with the present invention includes an integrated pseudolite 100, into which at least four pseudolites 111, 112, 113, 114, and 115 (which constitute respective modules) are integrated, and a single synchronization clock 110 which is configured as a module for distributing clock information so that the pseudolites 111, 112, 113, 114, and 115 are synchronized. As illustrated in FIG. 1, the at least four pseudolites 111, 112, 113, 114, and 115, which constitute respective modules, are configured to generate navigation signals, which are transmitted to users through corresponding antennas 121, 122, 123, 124, and 125, respectively. Therefore, respective pseudolites 111, 112, 113, 114, and 115 are synchronized with reference to clocks received from the single synchronization clock 110 and transmit signals. In the case of a GPS receiver 200 configured for both indoor and outdoor environments, signals from both a real GPS system and the pseudolite navigation system can be processed for precise positioning.

In general, a GPS receiver 200 in a GPS system receives navigation signals from GPS satellites, which are synchronized by precise atomic clocks, and measures the distance (pseudo-distance). The GPS receiver also receives almanac and ephemeris data from the GPS satellites and calculates their current positions. In order to calculate the current positions of satellites, in theory, signals from three satellites are sufficient to determine the position of the receiver based on triangulation. However, when the user's GPS receiver 200 is equipped with a TCXO-grade clock source with large clock error, and when signals from only three satellites are used, the clock error from the clock source of the GPS receiver 200 must be solved as an unknown parameter. In order to avoid this problem, an additional satellite signal is used to calculate the user's position and the receiver clock error. This mechanism is adopted by a pseudolite system so that, in a shadow area where GPS satellites are unavailable, virtual GPS satellites (i.e. pseudolites) are used for positioning.

However, the conventional pseudolite system is too expensive to construct. Therefore, the present invention is directed to constructing a pseudolite system of comparable performance at a substantially reduced cost.

In accordance with the present invention, at least four pseudolites 111, 112, 113, 114, and 115, which constitute respective modules, are integrated into an integrated pseudolite 100 and, instead of installing a clock (e.g. TCXO) in each of the pseudolites 111, 112, 113, 114, and 115, a single synchronization clock 110 is used to synchronize navigation signals. Specifically, the single synchronization clock 110 guarantees that navigation signals generated by respective pseudolites 111, 112, 113, 114, and 115 are transmitted through pseudolite antennas 121, 122, 123, 124, and 125 which are arranged in optimum geometry. The optimum geometry may be determined so that the distance between the pseudolites 111, 112, 113, 114, and 115 and the pseudolite antennas 121, 122, 123, 124, and 125 is the same, in order to remove delay caused by lines. Those skilled in the art can understand that the optimum geometry may be varied depending on the shape of the shadow area or indoor space, which will not be described in more detail.

The GPS receiver 200 can receive signals transmitted in the above-mentioned optimum geometry and perform precise positioning in a shadow area where there are no visible GPS satellites. Specifically, the GPS receiver 200 receives pseudolite PRN codes, pseudolite position information (antenna position), antenna calibration information, and the like from the pseudolites 111, 112, 113, 114, and 115 through respective antennas 121, 122, 123, 124, and 125, and performs positioning using the received signals. In order to determine the clock errors of the user terminal and the integrated pseudolite 100, five pseudolites are used. Alternatively, the difference of time between both clocks is determined, and four pseudolites are used. This approach, by simply adding a positioning algorithm to a conventional GPS receiver, constructs a pseudolite system enabling continuous positioning in either indoor or outdoor environment.

The above-described present invention is summarized as follows: Carrier waves are loaded with PRN codes, which are identical to GPS signals, and proper navigation data. At least four pseudolites are synchronized by a single clock and are integrated into a single platform. Antennas emit navigation signals from corresponding pseudolites. The antennas for emitting navigation signals are arranged in geometry maintaining optimum positioning precision, and the GPS user terminal receives the navigation signals and performs positioning.

The pseudolites 111, 112, 113, 114, and 115 in accordance with the present invention are integrated into a single platform so that they are synchronized by a single clock (e.g. TCXO) source.

Respective antennas 121, 122, 123, 124, and 125 for signal transmission are arranged so that the Geometric Dilution Of Precision (GDOP) is optimized for positioning in the positioning service area, and the geometry and error elements resulting from the geometry are calibrated.

Each of the modularized pseudolites 111, 112, 113, 114, and 115 may transmit navigation data (message) including the geometry of connected antennas and error elements resulting from the geometry.

In order to determine the clock error of the pseudolites during positioning by the user terminal, five pseudolites are used, i.e. one plus the number (four) of pseudolites needed by the conventional navigation system. Alternatively, four pseudolites are used, and the difference between the clocks of the user terminal and the pseudolite system is determined, thereby positioning the user.

When the PRN code of a navigation signal received by the user terminal belongs to a real satellite, the conventional GPS positioning method is followed and, when the PRN code belongs to a pseudolite, positioning is performed based on geometry information and calibration information from the pseudolite. When both signals are received simultaneously, positioning is performed based on a signal providing optimum GDOP.

Those skilled in the art can understand that, although the present invention has been described in connection with a GPS system, the present invention is not limited to GPS. Specifically, when Galileo system is available, i.e. in a Galileo/GPS combined system, pseudolites can be similarly used by simply using Galileo/GPS combined signals and replacing the positioning algorithm of the user terminal.

In accordance with the exemplary embodiments of the present invention, the same functionality and performance of a conventional pseudolite system, which enables positioning in a shadow area where GPS satellites are unavailable, is provided by a system at a substantially reduced cost, which has a single clock and requires no reference station and no wireless network for providing calibration information.

While the present invention has been described with respect to the specific embodiments, it will be apparent to those skilled in the art that various changes and modifications may be made without departing from the spirit and scope of the invention as defined in the following claims.

The invention claimed is:

1. An apparatus for transmitting pseudolite signals for navigation, comprising:
   an integrated pseudolite including at least four pseudolites each configured to generate and output a pseudolite code;
   at least four geometrically disposed antennas, each corresponding to one of the pseudolites in the integrated pseudolite and configured to transmit a pseudolite signal outputted by the corresponding pseudolite containing the pseudolite code; and
   a single synchronization clock unit connected to the integrated pseudolite and configured to provide a synchronization clock to each of the pseudolites in the integrated pseudolite, so as to synchronize the pseudolites to the synchronization clock, wherein
   each of the pseudolites in the integrated pseudolite simultaneously outputs the pseudolite code including a PRN (pseudorandom noise) identification number, pseudolite position information and antenna calibration information through the one of the antennas;
   the PRNs are used as the pseudolite signals for navigation and are simultaneously transmitted to the antennas, each PRN to one of the antennas corresponding to one of the pseudolites that generates the PRN, and
   the pseudolites are integrated into a single platform to be synchronized by a single clock as the synchronization clock.

2. The apparatus of claim 1, wherein each of the pseudolites is configured to output calibration information for clock calibration together.

3. The apparatus of claim 1, wherein the pseudolite code for navigation are a PRN code reserved to pseudolites identical to GPS signals.

4. The apparatus of claim 1, wherein the number of the pseudolites is five.

5. The apparatus of claim 1, wherein the pseudolite code for navigation is a Galileo/GPS combined signal.

6. The positioning system of claim 1, wherein the pseudolites are GPS stations other than satellites.

7. A positioning system using pseudolites, comprising:
   a pseudolite signal transmission system comprising a clock supply unit configured to provide a single synchronization clock, at least four pseudolites integrated into an integrated pseudolite and configured to generate PRN codes as pseudolite codes identical to GPS signals and predetermined navigation data and output the generated PRN codes and navigation data while being synchronized with the single synchronization clock, and at least four antennas each corresponding to one of the pseudolites in the integrated pseudolite and configured to emit output signals of the corresponding pseudolite; and
   a receiver configured to receive a navigation signal transmitted from each of the pseudolite antennas and perform positioning, wherein
   each of the pseudolites in the integrated pseudolite simultaneously outputs one of the pseudolite codes including a PRN (pseudorandom noise) identification number, pseudolite position information and antenna calibration information through one of the antennas;
   the PRNs are used as the pseudolite signals for navigation and are simultaneously transmitted to the antennas, each PRN to one of the antennas corresponding to one of the pseudolites that generates the PRN, and
   the pseudolites are integrated into a single platform to be synchronized by a single clock as the synchronization clock.

8. The positioning system of claim 7, wherein each of the antennas is arranged to obtain Geometric Dilution Of Precision (GDOP) conforming to a shape of a positioning service area.

9. The positioning system of claim 8, wherein each of the pseudolites is configured to output information together, the information enabling calibration of an error element caused by geometry of the antennas.

10. The positioning system of claim 9, wherein the error element is calibration information for clock calibration including initial phase differences.

11. The positioning system of claim 7, wherein the number of the pseudolites is five.

12. The positioning system of claim 7, wherein the pseudolite codes for navigation are Galileo/GPS combined signals.

13. The positioning system of claim 12, wherein the receiver is configured to perform positioning,
   when the navigation data is a Galileo/GPS combined signal, using the combined signal to perform positioning, and
   when the navigation data is a GPS signal, using a PRN code emitted by each pseudolite.

14. The apparatus of claim 7, wherein the pseudolites are GPS stations other than satellites.

* * * * *